(12) United States Patent
Roberts et al.

(10) Patent No.: US 10,736,204 B2
(45) Date of Patent: Aug. 4, 2020

(54) PLASMA POWER TOOL

(71) Applicants: Hypertherm, Inc., Hanover, NH (US);
Annetle M. Hoffa, Lebanon, NH (US)

(72) Inventors: Jesse A. Roberts, Cornish, NH (US);
Michael Scheller, Granthan, NH (US);
Michael Hoffa, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 144 days.

(21) Appl. No.: 15/790,671

(22) Filed: Oct. 23, 2017

(65) Prior Publication Data

US 2018/0116043 A1 Apr. 26, 2018

Related U.S. Application Data

(60) Provisional application No. 62/411,157, filed on Oct. 21, 2016.

(51) Int. Cl.
*B23K 10/00* (2006.01)
*H05H 1/34* (2006.01)
*B23H 1/04* (2006.01)

(52) U.S. Cl.
CPC ............. *H05H 1/34* (2013.01); *B23K 10/00* (2013.01); *B23H 1/04* (2013.01); *H05H 2277/14* (2013.01)

(58) Field of Classification Search
CPC ........ B23K 10/00; B23K 10/006; B23H 1/04; H05H 1/34; H05H 1/26; H05H 1/36
USPC ............ 219/121.39, 121.45, 121.48, 121.52, 219/121.54, 121.59
See application file for complete search history.

(56) References Cited

U.S. PATENT DOCUMENTS

| | | | |
|---|---|---|---|
| 3,309,497 A | 3/1967 | Kensrue | |
| 4,182,949 A | 1/1980 | Powers et al. | |
| 4,370,539 A | 1/1983 | Garlanov | |
| 4,525,621 A | 6/1985 | Puschner | |
| 4,791,268 A | 12/1988 | Sanders et al. | |
| 5,070,227 A | 12/1991 | Luo et al. | |
| 5,086,205 A | 2/1992 | Thommes | |
| 5,225,657 A | 7/1993 | Blankenship | |
| 5,225,658 A | 7/1993 | Yamaguchi et al. | |
| 5,250,786 A | 10/1993 | Kikuchi et al. | |
| 5,416,297 A | 5/1995 | Luo et al. | |
| 5,472,024 A | 12/1995 | Brugerolle et al. | |
| 5,660,745 A | 8/1997 | Naor | |

(Continued)

FOREIGN PATENT DOCUMENTS

| CA | 1 090 428 | 11/1980 |
|---|---|---|
| CN | 86210798 | 10/1987 |

(Continued)

*Primary Examiner* — Mark H Paschall
(74) *Attorney, Agent, or Firm* — Proskauer Rose LLP

(57) ABSTRACT

A hand-held plasma power tool is provided, which includes a hand-held housing, a plasma delivery tip section at least partially disposed within the housing for delivering a plasma arc to a workpiece, an air compressor disposed within the housing for providing a gas to the plasma delivery tip section, and a power source disposed within the housing for providing a current to at least one of the air compressor or the plasma delivery tip section. The hand-held plasma power tool further comprises a handle section defined by at least a portion of the housing. The handle section is configured to enable an operator to manipulate the plasma power tool by hand while delivering the plasma arc to the workpiece.

16 Claims, 3 Drawing Sheets

(56) References Cited

U.S. PATENT DOCUMENTS

| | | | |
|---|---|---|---|
| 5,828,030 A | 10/1998 | Naor | |
| 5,886,315 A | 3/1999 | Lu et al. | |
| 5,900,169 A | 5/1999 | Borowy et al. | |
| 5,961,855 A | 10/1999 | Hewett et al. | |
| 6,051,809 A | 4/2000 | Colella | |
| 6,054,670 A | 4/2000 | Naor | |
| 6,111,215 A | 8/2000 | Lilly | |
| 6,194,682 B1 * | 2/2001 | Schneider | B23K 10/00 219/121.48 |
| 6,225,596 B1 | 5/2001 | Chandler et al. | |
| 6,242,710 B1 | 6/2001 | Naor | |
| 6,331,694 B1 | 12/2001 | Blankenship | |
| 6,350,960 B1 | 2/2002 | Norris | |
| 6,406,759 B1 | 6/2002 | Roth | |
| 6,444,944 B2 | 9/2002 | Schneider et al. | |
| 6,476,354 B1 | 11/2002 | Jank et al. | |
| 6,479,795 B1 | 11/2002 | Albrecht et al. | |
| 6,486,430 B2 | 11/2002 | Naor | |
| 6,512,201 B2 | 1/2003 | Blankenship | |
| 6,552,303 B1 | 4/2003 | Blankenship et al. | |
| 6,703,581 B2 | 3/2004 | Jones et al. | |
| 6,747,246 B2 | 6/2004 | Crandell, III | |
| 6,777,649 B2 | 8/2004 | Reynolds et al. | |
| 6,815,632 B2 | 11/2004 | Dallavalle | |
| 6,818,860 B1 | 11/2004 | Stava et al. | |
| 6,881,921 B2 | 4/2005 | Horner-Richardson | |
| 6,903,301 B2 | 6/2005 | Jones et al. | |
| 6,977,358 B2 | 12/2005 | Albrecht et al. | |
| 6,982,398 B2 | 1/2006 | Albrecht | |
| 7,183,517 B2 | 2/2007 | Albrecht et al. | |
| 7,188,645 B2 | 3/2007 | Bender et al. | |
| 7,355,141 B2 | 4/2008 | Albrecht et al. | |
| 7,423,238 B2 | 9/2008 | Stanzel et al. | |
| 8,350,182 B2 * | 1/2013 | Shipulski | B23K 10/02 219/121.39 |
| 8,373,084 B2 | 2/2013 | Salsich | |
| 8,890,021 B2 | 11/2014 | Shipulski et al. | |
| 9,040,869 B2 * | 5/2015 | Salsich | B23K 1/0016 219/121.54 |
| 9,533,367 B2 | 1/2017 | Carrier et al. | |
| 2001/0037996 A1 | 11/2001 | Naor | |
| 2001/0042736 A1 | 11/2001 | Schneider et al. | |
| 2002/0023908 A1 | 2/2002 | Blankenship | |
| 2002/0117483 A1 | 8/2002 | Jones et al. | |
| 2002/0117484 A1 | 8/2002 | Jones et al. | |
| 2002/0187066 A1 | 12/2002 | Yu et al. | |
| 2004/0069752 A1 | 4/2004 | Ulrich et al. | |
| 2004/0149702 A1 | 8/2004 | Dallavalle | |
| 2004/0232118 A1 | 11/2004 | Horner-Richardson et al. | |
| 2005/0000946 A1 * | 1/2005 | Albrecht | B23K 9/173 219/74 |
| 2005/0073282 A1 | 4/2005 | Carrier et al. | |
| 2005/0077878 A1 | 4/2005 | Carrier et al. | |
| 2005/0109748 A1 | 5/2005 | Albrecht et al. | |
| 2005/0111995 A1 | 5/2005 | Everson | |
| 2005/0252889 A1 | 11/2005 | Stanzel et al. | |
| 2005/0252890 A1 | 11/2005 | Stanzel et al. | |
| 2005/0252899 A1 | 11/2005 | Stanzel et al. | |
| 2005/0263514 A1 | 12/2005 | Albrecht | |
| 2006/0124638 A1 | 6/2006 | Jensen | |
| 2006/0138113 A1 | 6/2006 | Ott | |
| 2007/0181547 A1 | 8/2007 | Vogel et al. | |
| 2007/0187376 A1 | 8/2007 | Albrecht et al. | |
| 2007/0221628 A1 | 9/2007 | Stanzel et al. | |
| 2007/0257084 A1 | 11/2007 | Carrier et al. | |
| 2008/0029153 A1 | 2/2008 | Margalit | |
| 2009/0057285 A1 * | 3/2009 | Bashore | B23K 9/32 219/130.1 |
| 2009/0159576 A1 | 6/2009 | Sommerfeld et al. | |
| 2011/0220619 A1 * | 9/2011 | Mehn | B23K 9/0953 219/108 |
| 2015/0069911 A1 * | 3/2015 | Nettesheim | G01F 1/00 315/111.21 |
| 2015/0373824 A1 | 12/2015 | Nettesheim et al. | |

FOREIGN PATENT DOCUMENTS

| | | |
|---|---|---|
| CN | 2682717 | 3/2005 |
| DK | 83 08 999.3 | 11/1983 |
| EP | 1 500 456 | 1/2005 |
| EP | 1 535 691 | 6/2005 |
| EP | 1 596 123 A1 | 11/2005 |
| EP | 1 676 666 A2 | 12/2005 |
| EP | 1 629 926 | 3/2006 |
| EP | 1 852 206 | 11/2007 |
| GB | 1 453 100 | 10/1976 |
| GB | 2 316 244 | 2/1998 |
| JP | 56077068 | 6/1981 |
| JP | 01245972 | 10/1989 |
| WO | 00/76709 A1 | 12/2000 |
| WO | 2005/026650 | 3/2005 |
| WO | 2009/085370 | 7/2009 |

* cited by examiner

PLASMA POWER TOOL

RELATED APPLICATIONS

This application claims priority to and benefit of U.S. Provisional Patent Application Ser. No. 62/411,157, filed on Oct. 21, 2016, which is owned by the assignee of the instant application and incorporated herein by reference in its entirety.

TECHNICAL FIELD

The invention relates generally to portable plasma power tools for processing materials, such as those that are hand-held.

BACKGROUND

Plasma arc torches are widely used for high temperature processing (e.g., heating, cutting, gouging and marking) of materials. FIG. 1 is a cross-sectional view of a conventional manual contact start plasma arc torch 100. The plasma arc torch 100 includes a torch body 102 and a torch tip 104 having multiple consumables, for example, an electrode 105, a nozzle 110, a retaining cap 115 and a swirl ring 120. In some embodiments, the torch tip 104 includes a shield 125 that is secured to the torch body 102 by the retaining cap 115. In some embodiments, the plasma arc torch 100 is mobile and transportable. For example, the torch 100 can be handheld for transport using an optional handle (not shown) attached thereto. The torch 100 additionally includes electrical connections, passages for cooling, and passages for arc control fluids (e.g., plasma gas).

Such a conventional plasma arc torch 100 is rather cumbersome to use in applications that require cutting of thin metallic workpieces. The tasks are often in remote locations or confined space, where electrical and/or gas connectivity is not possible. Other tools, including aviation snips, nibblers, hole cutters, jigsaws, etc., are also currently used for cutting thin metallic workpieces. However, these tools all have a number of drawbacks including poor ease of use, inefficiency, messiness and noise pollution. For example, aviation snips are ergonomically difficult, require skilled technicians to operate, produce sharp burrs, and are time consuming to us. Nibblers tend to be noisy, messy, and heavy. Power shears also have limitations due to their size, weight and restricted orientations. It is therefore desirable to provide a portable plasma power tool that provides a more productive means of cutting and trimming thin metals.

SUMMARY OF THE INVENTION

The present invention provides handheld plasma power tools that operate effectively at low gas consumption and/or low power levels, while providing portability and performance for thin-metal cutting applications. As such, embodiments of the invention can be used in a variety of industries and situations, such as at construction sites, in heating, ventilating and air conditioning (HVAC) fields, and in automotive and plant maintenance. Generally, the plasma power tools of the present invention have wide applicability because they combine portability and versatility with a low price point.

In one aspect, a hand-held plasma power tool is provided. The hand-held plasma power tool comprises a hand-held housing, a plasma delivery tip section at least partially disposed within the housing for delivering a plasma arc to a workpiece, an air compressor disposed within the housing for providing a gas to the plasma delivery tip section, and a power source disposed within the housing for providing a current to at least one of the air compressor or the plasma delivery tip section. The hand-held plasma power tool further comprises a handle section defined by at least a portion of the housing. The handle section is configured to enable an operator to manipulate the plasma power tool by hand while delivering the plasma arc to the workpiece.

In another aspect, a hand-held plasma power tool is provided. The hand-held plasma power tool comprises a housing, a plasma delivery tip section at least partially disposed within the housing for delivering a plasma arc to a workpiece, and an air compressor disposed within the housing for providing a gas to the plasma delivery tip section. The hand-held plasma power tool also includes a power circuit board disposed within the housing for converting an input AC current to a DC torch current and providing the DC torch current to at least one of the air compressor or the plasma delivery tip section. The hand-held plasma power tool further includes a handle section of the housing defined by at least a portion of the housing. The handle section is configured to enable an operator to hold the entirety of the plasma power tool by hand while delivering the plasma arc to the workpiece.

In yet another aspect, a hand-held plasma power tool is provided. The hand-held plasma power tool comprises a plasma delivery tip section for delivering a plasma arc to a workpiece, an air compressor for providing a gas to the plasma delivery tip section and a power source for providing a current to at least one of the air compressor or the plasma delivery tip section. The hand-held plasma power tool further comprises a hand-held housing. At least a portion of the plasma delivery tip section, the air compressor, and the power source are enclosed within the housing. At least a portion of the housing defines a handle section being configured to enable an operator to hold the entirety of the plasma power tool by hand while delivering the plasma arc to the workpiece.

Any of the above aspects can include one or more of the following features. In some embodiments, at least one of the air compressor or the power source is disposed in the handle section of the housing. The air compressor can be disposed in a holder portion of the handle section and the power source can be disposed in a base portion of the handle section. In some embodiments, the hand-held plasma power tool further comprises a trigger disposed on an external surface of the handle section. The trigger is configured to initiate the plasma arc.

In some embodiments, the housing encases a plurality of sections of the power tool, including the plasma delivery tip section, the handle section, and a neck section connecting the plasma delivery tip section and the handle section.

In some embodiments, the power source comprises one or more batteries for providing a DC current to at least one of the air compressor or the plasma delivery tip section. In some embodiments, the power source includes a corded input power connection. In such an instance, the power source comprises a power circuit board disposed within the housing for receiving an AC input current via the input power connection, converting the AC input current to a DC torch current, and providing the DC torch current to at least one of the plasma delivery tip section or the air compressor.

In some embodiments, the current supplied by the power source is between about 6 amps to about 10 amps. In some embodiments, a flow rate of the gas supplied by the air compressor is less than about 50 standard cubic feet per hour (scfh). In some embodiments, the plasma power tool is operated in a single voltage. The power source may not include multi-voltage circuitry.

In some embodiments, the hand-held plasma power tool further comprises at least one transmission medium disposed within the housing for transmitting at least one of the gas from the air compressor or the current from the power source to the plasma delivery tip section. In some embodiments, the hand-held plasma power tool further comprises a controller disposed within the housing. The controller maintains communication with at least one of (i) the air compressor to control the gas delivered to the plasma delivery tip section or (ii) the power source to control the current delivered to the plasma delivery tip section or the air compressor.

In some embodiments, the plasma delivery tip section is connected to at least one of an electrode, a nozzle or a swirl ring. In some embodiments, at least a portion of the housing defines a second handle section of the power tool, the second handle section including at least one of the air compressor or the power source. In some embodiments, the plasma power tool does not include a grounding element for grounding the workpiece.

BRIEF DESCRIPTION OF THE DRAWINGS

The foregoing and the invention will be more fully understood from the following description of various embodiments, when read together with the accompanying figures. The drawings are not necessarily to scale, emphasis instead being placed upon illustrating the principles of the invention.

DETAILED DESCRIPTION

Figure 2:
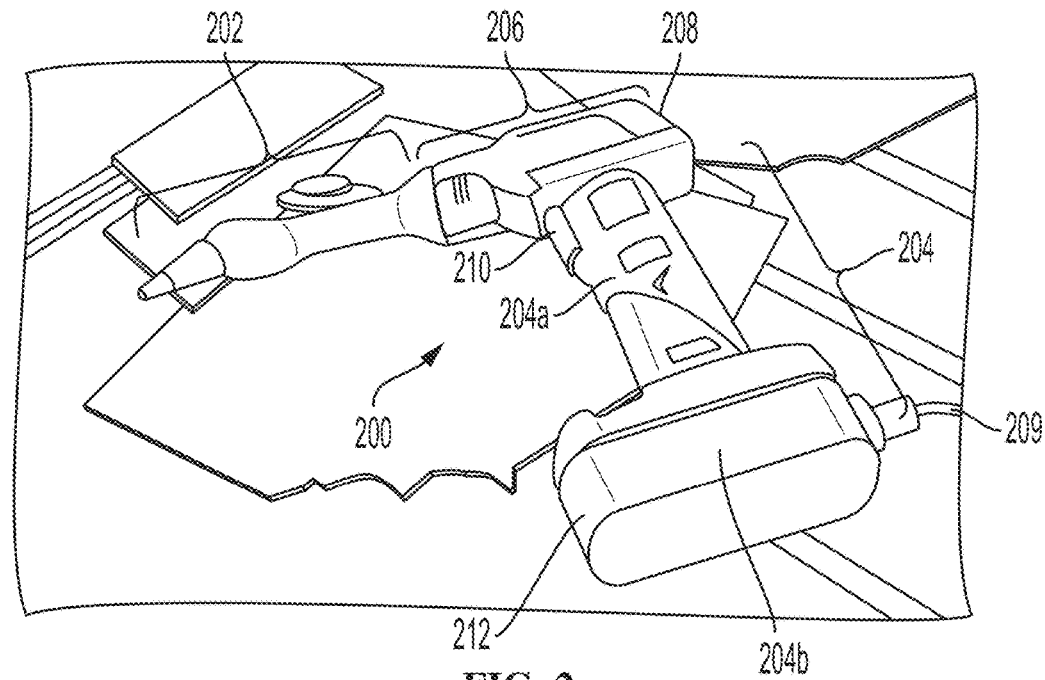
FIG. 2 is a perspective view of an exemplary plasma power tool, according to some embodiments of the present invention.

FIG. 2 is a perspective view of an exemplary plasma power tool 200, according to some embodiments of the present invention. Generally, the plasma power tool 200 includes a plasma delivery tip section 202, a handle section 204, and a neck section 206 that connects the plasma delivery tip section 202 to the handle section 204, such as in an L-shaped drill-like arrangement. At least a portion of the plasma delivery tip section 202, the handle section 204 and the neck section 206 can be encased in a single handheld enclosure/housing 208. The pistol-like handle section 204, which is defined by at least a portion of the housing 208, is configured to allow an operator to grip the tool 200 securely by hand during a torch operation (i.e., while delivering a plasma arc to a workpiece). As shown, the handle section 204 can comprise a holder portion 204a and a wider base portion 204b. The handle section 204 can include a trigger 210 that an operator can manipulate to start and stop initiation of a plasma arc by the power tool 200. As shown, the trigger 210 is disposed on the housing 208, such as on an external surface of the holder portion 204a of the handle section 204 of the plasma power tool 200. The plasma delivery tip section 202 of the plasma power tool 200, which is at least partially disposed within the housing 208 and/or rigidly affixed to the housing 208, is configured to connect to multiple consumables to deliver a plasma arc onto a workpiece. These consumables include, for example, an electrode, a nozzle and/or a swirl ring. These consumables can be encapsulated in a unitary cartridge connectable to the plasma delivery tip section 202. In some embodiments, a retaining component, such as a retaining cap, is used to retain the individual consumables or a cartridge holding together these consumables to the plasma delivery tip section 202.

In some embodiments, the neck section 206 is flexible and/or retractable to allow the plasma power tool 200 to navigate in difficult-to-reach places. Similarly, the plasma delivery tip section 202 can have a thin and/or lengthened profile for accessing narrow cavities and spaces. In some embodiments, the plasma power tool 200 is attached to one or more shape guides (not shown), such as a compass-style hole cutting guide (e.g., a magnetic and string), to guide an operator during a cutting operation. In some embodiments, the power tool 204 includes an additional front handle section (not shown) that is connected to the plasma delivery section 202, such that an operator can grip the front handle section with one hand and the handle section 204 with the other hand during torch operation. The front handle section is adapted to be in the same housing 208 as the other components of the power tool 200.

In some embodiments, at least one of an onboard gas source or a power source is disposed in the housing 208, such as in the handle section 204 of the housing. For example, the onboard gas source can be disposed within the holder portion 204a of the handle section 204 or the neck section 206 of the plasma power tool 200. The power source can be disposed in the base portion 204b of the handle section 204. Thus, an operator can manipulate, move, and direct the entire power tool 200, including the housing 208, the plasma delivery tip section 202, the neck section 206 and the trigger 210 by means of the handle section 204, where one or more of these sections include a power source and a gas source. In some embodiments, if a second front handle section is present in the power tool 200, at least one of the gas source or the power source is disposed in the front handle section. In some embodiments, the power source comprises a power circuit board 212 that processes electrical power received from the electrical power grid via a power cord 209, as shown in FIG. 2. In alternative embodiments, a portable power source (e.g., one or more batteries) is disposed in the housing 208 of the power tool 200, such as in the base portion 204b of the handle section 204, to provide complete wireless/cordless torch operations. Details regarding the gas source and the power source are described below.

Thus, the plasma power tool 200 is a self-contained handheld device capable of processing metallic materials without large, bulky gas canisters (and, in some embodiments, without a continuous, fixed gas source) and optionally, without connection to the electrical power grid by a power cord. The power tool 200 can thus be leadless, such that it is not connected by lead(s) to one or more external gas sources or power supplies. In embodiments where the power tool 200 receives power from an external electrical power grid, a single electrical cord 209 may be used to connect the power tool 200 to the electrical power grid (e.g., via a wall socket) without requiring other corded connections, such as to a remote gas supply or to a ground line that is universal in conventional plasma cutting torches (e.g., the torch 100 of FIG. 1). In various embodiments, the system is lightweight, mobile and transportable. For example, the plasma power tool 200 is comparable in size to that of a drill, thereby allowing an operator to easily lift, hold and manipulate the entirety of the power tool 200 by hand to perform a cutting operation, without carrying any additional accessories (e.g., one or more external gas sources or power sources). For example, with every cutting operation by the power tool 200, the entire housing, including the gas source 302, the power source 304 and the plasma delivery tip section 202, moves along with the cut. In some embodiments, the plasma power tool 200 includes a gas port (not shown) and/or a power port (not shown) that give the operator the option to connect the plasma power tool 200 to an external gas source and/or an external power supply to sustain operations for extended periods of time.

Figure 3:
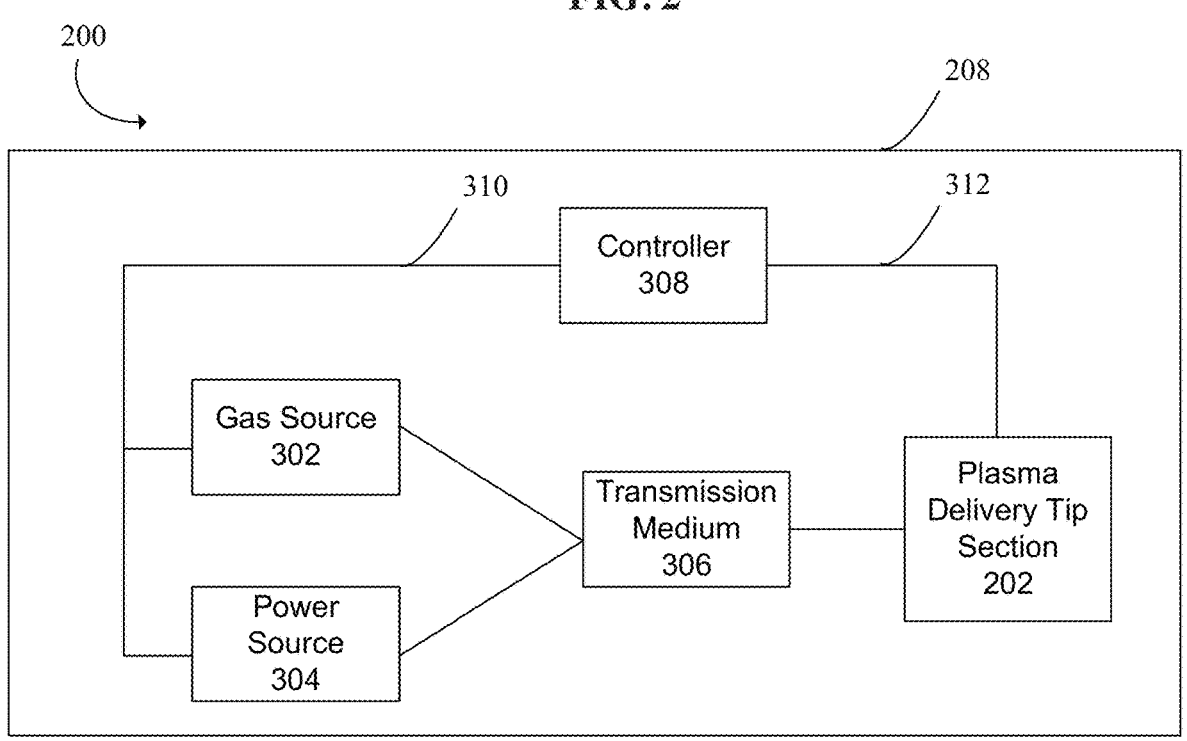
FIG. 3 is a block diagram showing a set of representative functional components of the plasma power tool of FIG. 2, according to some embodiments of the present invention.

FIG. 3 is a block diagram showing a set of representative functional components of the plasma power tool 200 of FIG. 2, according to some embodiments of the present invention. As shown, the housing 208 of the power tool 200 houses a number of primary components including at least a portion of the plasma delivery tip section 202 that is connectable to multiple consumables, a gas source 302, a power source 304, at least one transmission medium 306, and at least one controller 308. In some embodiments, both the gas source 302 and the power source 304 are disposed in the handle section 20. For example, the gas source 302 can be disposed in the holder portion 204a of the handle section 204 while the power source 304 can be disposed in the base portion 204b of the handle section 204. In other embodiments, at least one of the gas source 302 or the power source 304 is distributed in any portion of the power tool 200, such as in the neck section 206, the plasma delivery tip section 202 or the optional front handle section.

The gas source 302 is disposed within the housing for providing a gas to the plasma delivery tip section 202. The gas provided by the gas source 302 can be plasma gas and, optionally, assist gas. The gas source 302 can be one or more replaceable and/or rechargeable gas containers or a portable on-board air compressor to provide gas to the plasma delivery tip section 202 via the transmission medium 306. If the gas source 302 comprises an air compressor, the compressor is adapted to provide a compressed air to the plasma delivery tip section 202. In some embodiments, the on-board air compressor is coupled to an electric motor (not shown), both of which are disposed in the housing 208, and the electric motor is configured to drive the air compressor and provide gas to the torch as plasma gas and, optionally, assist gas. For example, the air compressor can be about 5.7 inches in length and about 3.75 in width. Alternatively, the gas source 302 can be hand operated and/or stored in an air tank (i.e., a paintball tank) or a cartridge within the housing 208. The gas source 302 can provide gas in the form of air or of a different composition (e.g., carbon dioxide, steam, and/or combustible fuel).

The power source 304 is disposed within the housing and includes power circuitry for providing current to at least one of the gas source 302 or the plasma delivery tip section 202 of the power tool 200. In some embodiments, the power source 304 is rechargeable and/or replaceable (e.g., in the form of one or more batteries) to provide a torch current to the plasma delivery tip section 202 and/or the gas source 302 via the transmission medium 306. In such an instance, the current provided by the batteries is DC current and the same DC current can be supplied to the plasma delivery tip section 202 and the gas source 302 with reduced conditioning. In some embodiments, the power source 304 supplies torch current to the power tool 200 by being plugged into a wall outlet via a corded input power connection 209. In such an instance, the power source 304 can comprise the power circuit board 212 disposed within the housing 208 (e.g., the base portion 204b of the handle section 204, as illustrated in FIG. 2), for receiving an AC input current via the input power connection 209, converting the AC input current to a DC torch current, and providing the DC torch current to at least one of the plasma delivery tip section 202 or the gas source 302. Generally, the input voltage and input current received via the input power connection 209 from an external power supply (e.g., a wall socket) can comply with the nominal standards of the region in which the power tool is operated, such as 120 V and 60 Hz for the U.S., 220V and 50 Hz for China, and 230 V and 50 Hz for Europe. In some embodiments, the power source 304 is a split power supply. For example, a portion of the power source 304 is located in the housing 208 (e.g., in the handle section 204) and another portion of the power source 304 is located external to the power tool 200 (e.g., on the belt of the operator or in a backpack worn by the operator). In another example, the power source 304 is split such that a portion is used to produce a plasma arc by the plasma delivery tip section 202 and another portion is used to power the gas source 302. Generally, different power supply functions can be separated across different portions of the power source 304.

The transmission medium 306, which can include an electrical transmission capability and/or a fluid transmission capability, routes electrical signals and/or fluid from where the gas source 302 and/or the power source 304 is located (e.g., in the handle section 204) to the plasma delivery tip section 202 within the housing 208. The electrical transmission capability can include an electrical lead set, a bus or a wireless connection for providing current from the power source 304. The fluid transmission capability can include a fluid conduit for providing gas from the gas source 302. In some embodiments, the plasma power tool 200 includes two transmission media (not shown) assigned to corresponding ones of the gas source 302 and the power source 304 for transmitting respective gas and current to the plasma delivery tip section 202.

The controller 308 can include electrical controls and/or a fluid controls (e.g., the trigger 210, relay, solenoid valve, pressure regulator, etc.). The controller 308 can be located in the neck section 206 or the handle section 204 within the housing 208. The controller 308 communicates with the power source 304 and the gas source 302 via at least one common electrical connection 310 (e.g., a bus). In addition, the controller 308 uses at least one other electrical connection 312 to communicate with the plasma delivery section 202. In some embodiments, the plasma power tool 200 includes multiple controllers (not shown) each configured to control at least one of current transmission, gas transmission or plasma arc generation.

The plasma delivery tip section 202 can be connected to one or more of an electrode, a nozzle or a swirl ring for introducing a plasma arc to a workpiece. These consumables can be suitably configured to support a low rate of gas flow therethrough, such as at less than about 50 standard cubic feet per hour (scfh), e.g., at about 15 scfh. The plasma delivery tip section 202 can start generating a plasma arc in response to an operator manipulating the trigger 210. In addition, the plasma power tool 200 can include various user controls (not shown), such as a current limiting switch, a toggle switch, a key pad, a touch pad, dials, knobs or other means to enable a user to manipulate or otherwise control parameters associated with plasma arc delivery. These additional user controls can also be disposed on the housing 208 of the plasma power tool 200.

Generally, the plasma power tool 200 is compact and relatively simple in design. In some embodiment, the plasma power tool 200 is configured to cut thin metal workpieces with thicknesses of about 20 gauge (ga) or higher, such as up to about 11 ga. In some embodiments, the gas source 302 is configured to provide a gas flow rate of less than about 50 standard cubic feet per hour (scfh), such as less than about 20 scfh. For example, the gas source 302 can generate about 50 pound per square inch (psi) of gas flow at about 15 scfh. In some embodiments, the plasma power tool 200 is operated with a single voltage (e.g., 120 volts), where no complex multi-voltage circuitry (e.g., boost and/or buck converter) is needed in the circuitry of the power source 304. In some embodiments, the power source 304 provides a low current output to the plasma power tool 200, such as between about 6 amps and about 15 amps. In embodiments where the power tool 200 is connected to line power via the corded connection 209 (i.e., without a battery), the power tool 200 can weigh less than 10 pounds, which includes the power source 304 comprising the power circuit board 212 and without a battery, the gas source 302 (e.g., an air compressor and, optionally, a compressor motor), the housing 208, the trigger 210, and the plasma delivery tip section 202. In other designs, the power tool 200 may weigh less than 8 pounds or less than 5 pounds. In some embodiments, the power source 304 maintains a high switching frequency for converting an input alternating current (e.g., received from a wall outlet via the corded connection 209) to an output direct current. Specifically, the usage of a higher switching frequency (e.g., about 180 kHz) means a smaller core with respect to one or more magnetic components, which allows the size and weight of the power tool 200 to be reduced and enabling the power tool 200 to be portable. Even though operating the power tool 200 at a higher switching frequency may result in increased noise, higher power loss differentiation, and/or increased temperature, a higher switching frequency is still desired in the context of the present invention due to the reduced size that can be achieved for the power tool 200.

As an example, the plasma power tool 200 can require about 830 watts to generate a plasma arc (83V*10 A) and about 60 watts to operate the gas source 302 in the form of a compressor (19.2V*3 A), thus requiring a total of only about 890 watts to operate. In some embodiments, the controller 308 of the plasma power tool 200 is also simpler in design and more straightforward compared to conventional plasma arc torches, such as the torch 100 of FIG. 1. Specifically, conventional plasma arc torches are designed to control and adjust a number of different system and process parameters (e.g., managing arc stretch and/or arc voltage) depending on various operating conditions or requirements. In contrast, the controller 308 of the power tool 200 only needs to manage a single output power/current without further adjustment or optimization (e.g., without allowing parameter adjustment with respect to material thickness or composition). Thus, the plasma power tool 200 represents a faster and easier way to cut relatively thin sheet metals. The power tool 200 is also portable and can be purchased at a lower price point in comparison to conventional plasma arc torches.

Figure 1:
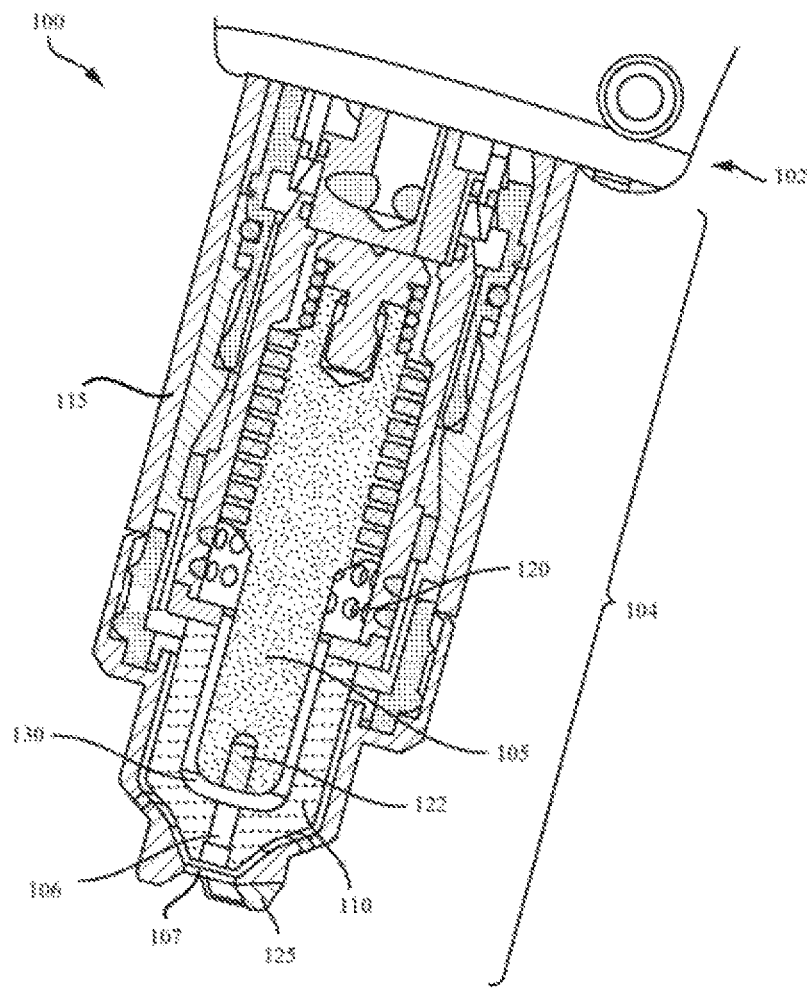
FIG. 1 is a cross-sectional view of a conventional manual contact start plasma arc torch.

In some embodiments, the plasma power tool 200 is capable of operating in a single, non-transferred arc mode during torch operation without switching from a pilot arc mode to a transfer arc mode that is typical of a contact start manual plasma arc torch, such as the torch 100 of FIG. 1. In some embodiments, the controller 308 of the plasma power tool 200 includes a single, non-transferred arc circuit (not shown) to generate and maintain a plasma arc within the plasma arc delivery tip section 202. In contrast, a conventional plasma arc torch requires both a pilot arc circuit and a transferred arc circuit to generate and maintain a plasma arc.

Figure 4:
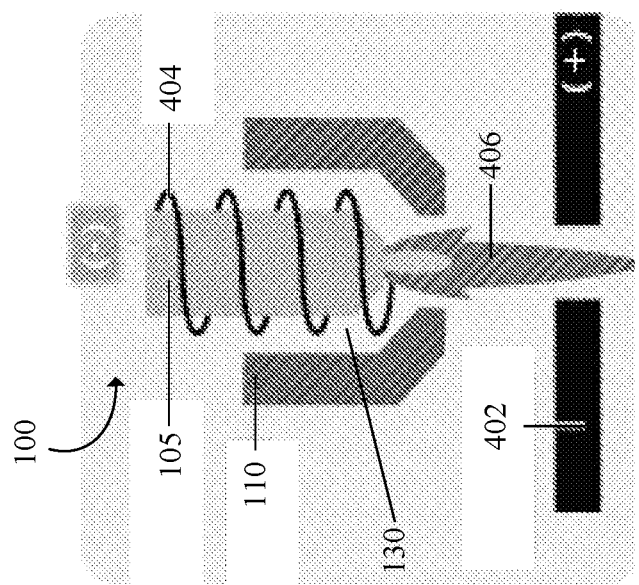
FIG. 4 shows the conventional plasma arc torch of FIG. 1 being operated in the pilot arc mode.

FIG. 4 shows the conventional plasma arc torch 100 of FIG. 1 being operated in the pilot arc mode. As shown, the torch 100 is remotely located relative to a workpiece 402 and does not physically contact the workpiece 402 during the pilot arc mode. Operating the torch 100 in the pilot arc mode includes first establishing physical contact and electrical communication between the electrode 105 and the nozzle 110, e.g., by using a biasing force from, for example, a spring (not shown). A current path and a low-level pilot arc current flow are established between the electrode 105 and the nozzle 110 while they are biased together. A plasma gas 404 (e.g., air) is introduced into the plasma chamber 130, such that gas pressure builds up in the plasma chamber 130 to break the physical contact between the electrode 105 and the nozzle 110 to separate the two components. The separation causes an electrical arc to be created in the gap between the electrode 105 and the nozzle 110 in the plasma chamber 130. The electrical arc ionizes the flowing plasma gas in the plasma chamber 130 to produce a plasma arc (i.e., a pilot arc) 406.

Next, in a transferred arc mode for operating the torch 100 (not illustrated), the plasma arc 406 is brought into contact with the workpiece 402 that is electrically grounded by positioning of the torch 100 in close proximity to the workpiece 402, but not physically contacting the workpiece 402. Upon the plasma arc 406 touching the workpiece 402, the electrical return path for the plasma arc transfers from the nozzle 110 to the grounded workpiece 402. The electrical return path from the nozzle 110 is opened (i.e., electrically disconnected) and the current flow is increased to a larger amount to enable processing (e.g., gouging, piercing or cutting) of the workpiece 402. In some embodiments, the torch 100 is connected to a pilot arc circuit (not shown) that is configured to provide a decreasing pilot arc current and a transfer arc circuit (not shown) that is configure to provide an increasing transfer arc current. Further, the torch 100 is attached to a ground clamp (not shown) to ground the workpiece 402 relative to the nozzle 110.

Figure 5:
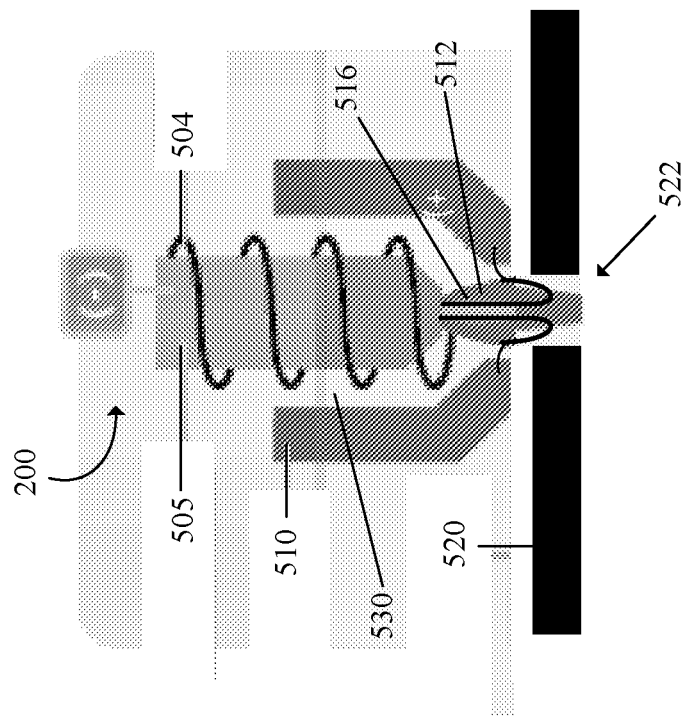
FIG. 5 shows the plasma power tool 200 of FIG. 2 being operated in a single mode for generating and maintaining a plasma arc, according to some embodiments of the present invention.

In contrast, FIG. 5 shows the plasma power tool 200 of FIG. 2 being operated in a single, non-transferred arc mode for generating and maintaining a plasma arc, according to some embodiments of the present invention. Thus, the plasma power tool 200 does not require operation in both a pilot arc mode and a transfer arc mode, as described above with reference to FIG. 4. Operating in this single mode includes establishing physical contact and electrical communication between an electrode 505 and a nozzle 510 of the plasma delivery tip section 202 of the power tool 200. A current path and a current flow are established between the electrode 505 and the nozzle 510 while they are biased together. A plasma gas 504 (e.g., air) is introduced into the plasma chamber 530, such that gas pressure builds up in the plasma chamber 530 to break the physical contact between the electrode 505 and the nozzle 510 to separate the two components. The separation causes an electrical arc to be created in the gap between the electrode 505 and the nozzle 510 in the plasma chamber 530. The electrical arc ionizes the flowing plasma gas in the plasma chamber 530 to produce a plasma arc 516.

In some embodiments, the plasma arc 516 is then brought adjacent to (but not physical contacting) a workpiece 520 to cut the workpiece 520. In this single, non-transferred arc mode of operation, the current 522 returns from the nozzle 510 during a cutting operation without substantially penetrating the workpiece 520. Specifically, the current 522, carried by the plasma arc 516, is pushed out of the nozzle 510 via the nozzle exit orifice 512 by an air flow. However, as the current 522 moves away from the nozzle 510 and toward the workpiece 520, the air flow dissipates in the gap between the tip of the nozzle 510 and the surface of the workpiece 520. Thus, the current 522 loops back to the nozzle 510 to complete its return path. Because the plasma arc 516 and the current 522 extends beyond the tip end of the nozzle 510, the plasma arc 516 is adapted to cut the workpiece 520, even if the workpiece is non-conductive.

In some embodiments, the nozzle 510 is brought into physical contact with the workpiece 520 to cut the workpiece 520 in a single, non-transferred arc mode of operation. Specifically, to cut the workpiece 520, an operator drags the nozzle 510 of the power tool 200 along a desired cutting path in the workpiece 520, which brings the workpiece 520 to the same working potential as the nozzle 510, if the workpiece 520 is conductive. During dragging, with all potentials being equal, momentum is likely to enable the plasma arc 516 and the cutting current 522 to prefer the lower edge of the conductive workpiece 520. The current 522 thus enters the conductive workpiece 520 prior to returning to the nozzle 510. In some embodiments, the workpiece 520 is a thin metal of about 20 ga to 11 ga. However, if the workpiece 520 is non-conductive, the current 522 is adapted to return from the nozzle 510 without entering the workpiece 520.

There are several significant differences between the present single-mode approach and the dual-mode approach described above with reference to FIG. 4. One difference is that a single current level is used throughout a cutting operation using the power tool 200. In contrast, the conventional torch 100 requires using a lower current in the pilot arc mode and a higher current in the transfer arc mode. Another difference is that the nozzle 502 of the power tool 200 can maintain physical contact with the workpiece 504 during the cutting operation, whereas the nozzle 110 of the conventional torch 100 needs to be physically remote from the workpiece 402 during a cutting operation. Yet another difference is that no separate grounding element (e.g., a ground clamp) is needed to ground the workpiece 520 of the power tool 200. In contrast, a ground clamp is necessary for the conventional torch 100 to ground the workpiece 402. The nozzle 510 can function as a grounding clamp for the power tool 200. Yet another difference is that during cutting, the current return path 522 in the power tool 200 can be via the nozzle 510, while the current return path in the conventional torch 100 is via the workpiece 402, and the nozzle 110 is electrically isolated during cutting. There is no need to electrically isolate the nozzle 510 of the power tool 200 during cutting since the operating current used in the power tool 200 is relatively low (e.g., about 6 to about 10 or 15 amp), thus less likely to damage the nozzle 510.

In some embodiments, the power tool 200 includes an optional pilot arc circuit and/or an optional transfer arc circuit to enable the power tool 200 to operate in the traditional dual-mode approach. The power tool 200 can also have an optional ground clamp attached thereto to ground a workpiece.

While the invention has been particularly shown and described with reference to specific embodiments, it should be understood by those skilled in the art that various changes in form and detail may be made therein without departing from the spirit and scope of the above description.

What is claimed is:

1. A hand-held plasma power tool comprising:
   a plasma delivery tip section for delivering a plasma arc to a workpiece to cut the workpiece;
   an air compressor for providing a gas of less than about 50 standard cubic feet per hour (scfh) to the plasma delivery tip section;
   a power source for providing a current of between about 6 amps to about 10 amps to at least one of the air compressor or the plasma delivery tip section; and
   a hand-held housing, wherein at least a portion of the plasma delivery tip section, the air compressor, and the power source are enclosed within the housing, and wherein at least a portion of the housing defines a handle section being configured to enable an operator to hold the entirety of the plasma power tool by hand while delivering the plasma arc to the workpiece.

2. The hand-held plasma power tool of claim 1, wherein at least one of the air compressor or the power source is disposed in the handle section of the housing.

3. The hand-held plasma power tool of claim 2, wherein the air compressor is disposed in a holder portion of the handle section and the power source is disposed in a base portion of the handle section.

4. The hand-held plasma power tool of claim 1, further comprising a trigger disposed on an external surface of the handle section, the trigger configured to initiate the plasma arc.

5. The hand-held plasma power tool of claim 1, wherein the housing encases a plurality of sections of the power tool, including the plasma delivery tip section, the handle section, and a neck section connecting the plasma delivery tip section and the handle section.

6. The hand-held plasma power tool of claim 1, wherein the power source comprises one or more batteries for providing a DC current to at least one of the air compressor or the plasma delivery tip section.

7. The handheld plasma power tool of claim 1, wherein the power source includes a corded input power connection.

8. The hand-held plasma power tool of claim 7, wherein the power source comprises a power circuit board disposed within the housing for receiving an AC input current via the input power connection, converting the AC input current to a DC torch current, and providing the DC torch current to at least one of the plasma delivery tip section or the air compressor.

9. The hand-held plasma power tool of claim 1, wherein the plasma power tool is operated in a single voltage.

10. The hand-held plasma power tool of claim 9, wherein the power source includes only single-voltage circuitry such that the plasma power tool is operated with a single voltage.

11. The hand-held plasma power tool of claim 1, wherein the plasma delivery tip section is connected to at least one of an electrode, a nozzle or a swirl ring.

12. The hand-held plasma power tool of claim 1, further comprising at least one transmission medium disposed within the housing for transmitting at least one of the gas from the air compressor or the current from the power source to the plasma delivery tip section.

13. The hand-held plasma power tool of claim 1, further comprising a controller disposed within the housing, the controller in communication with at least one of (i) the air compressor to control the gas delivered to the plasma delivery tip section or (ii) the power source to control the current delivered to the plasma delivery tip section or the air compressor.

14. The hand-held plasma power tool of claim 1, wherein at least a portion of the housing defines a second handle section of the power tool, the second handle section including at least one of the air compressor or the power source.

15. The hand-held plasma power tool of claim 1, wherein the plasma power tool does not include a grounding element for grounding the workpiece.

16. A hand-held plasma power tool comprising:
- a plasma delivery tip section for delivering a plasma arc to a workpiece to cut the workpiece;
- an air compressor for providing a gas of less than about 50 standard cubic feet per hour (scfh) to the plasma delivery tip section;
- a power circuit board for providing a torch current of less than equal to about 15 amps to at least one of the air compressor or the plasma delivery tip section; and
- a hand-held housing, wherein at least a portion of the plasma delivery tip section, the air compressor, and the power circuit board are enclosed within the housing, and wherein at least a portion of the housing defines a handle section being configured to enable an operator to hold the entirety of the plasma power tool by hand while delivering the plasma arc to the workpiece.

* * * * *